United States Patent
Mangal et al.

(10) Patent No.: US 11,157,005 B2
(45) Date of Patent: Oct. 26, 2021

(54) AUTOMATED-TAXI THAT PROPOSES ALTERNATE-DESTINATION TO OPTIMIZE ROUTE

(71) Applicant: Motional AD LLC, Boston, MA (US)

(72) Inventors: Nandita Mangal, Palo Alto, CA (US); Michael H. Laur, Mission Viejo, CA (US)

(73) Assignee: Motional AD LLC, Boston, MA (US)

( * ) Notice: Subject to any disclaimer, the term of this patent is extended or adjusted under 35 U.S.C. 154(b) by 214 days.

(21) Appl. No.: 16/021,522

(22) Filed: Jun. 28, 2018

(65) Prior Publication Data

US 2020/0004250 A1 Jan. 2, 2020

Related U.S. Application Data

(60) Provisional application No. 62/690,494, filed on Jun. 27, 2018.

(51) Int. Cl.
*G05D 1/02* (2020.01)
*G01C 21/34* (2006.01)
(Continued)

(52) U.S. Cl.
CPC ....... *G05D 1/0212* (2013.01); *G01C 21/3461* (2013.01); *G01C 21/3667* (2013.01); *G05D 2201/0213* (2013.01); *H04L 67/10* (2013.01)

(58) Field of Classification Search
CPC ......... G05D 1/0212; G05D 2201/0213; G01C 21/3461; G01C 21/3667; H04L 67/10
(Continued)

(56) References Cited

U.S. PATENT DOCUMENTS 9,953,539 B1* 4/2018 Gkiotsalitis ............. G06N 5/04
10,126,138 B1* 11/2018 Farmer ................... G06F 16/29
(Continued)

FOREIGN PATENT DOCUMENTS

EP 3101600 A1 12/2016

OTHER PUBLICATIONS

European Search Report for Application No. 19176106.3, European Patent Office, dated Nov. 22, 2019.
(Continued)

*Primary Examiner* — Krishnan Ramesh
(74) *Attorney, Agent, or Firm* — Fish & Richardson P.C.

(57) ABSTRACT

A system for operating an automated-taxi includes an input-device and a controller-circuit. The input-device is operable by a client to indicate a desired-destination of the client. The display is viewable by the client. The controller-circuit is in communication with the input-device and the display. The controller-circuit is configured determine a preferred-route in accordance with the desired-destination and a plurality of other-destinations indicated by a plurality of other-clients of an automated-taxi. The preferred-route includes an alternate-destination for the client. The alternate-destination characterized as within a distance-threshold of the desired-destination of the client. The controller-circuit is further configured to operate the display to request a route-approval from the client for the alternate-destination, and, in response to receiving the route-approval, operate the automated-taxi in accordance with the preferred-route to transport the client to the alternate-destination.

12 Claims, 3 Drawing Sheets

(51) Int. Cl.
*G01C 21/36* (2006.01)
*H04L 29/08* (2006.01)

(58) Field of Classification Search
USPC .......................................................... 701/23
See application file for complete search history.

(56) References Cited

U.S. PATENT DOCUMENTS

| | | | |
|---|---|---|---|
| 2009/0150067 A1* | 6/2009 | Lindman | G01C 21/3476 |
| | | | 701/465 |
| 2016/0342946 A1 | 11/2016 | Herraiz Herraiz | |
| 2016/0349067 A1* | 12/2016 | Fowe | H04W 4/02 |
| 2017/0365030 A1 | 12/2017 | Shoham et al. | |
| 2018/0038710 A1* | 2/2018 | Shang | G01C 21/367 |
| 2018/0209803 A1* | 7/2018 | Rakah | G01C 21/343 |
| 2018/0224858 A1* | 8/2018 | Watanabe | G05D 1/0088 |
| 2018/0245932 A1* | 8/2018 | Glasgow | G01S 19/13 |
| 2019/0072964 A1* | 3/2019 | Nix | G06Q 10/0631 |
| 2019/0196503 A1* | 6/2019 | Abari | G06Q 10/063 |

OTHER PUBLICATIONS

Annaswamy Anuradha M et al: "Transactive Control in Smart Cities", Apr. 1, 2018, pp. 518-537.
European Search Report and Written Opinion for Application No. 19181182.7, European Patent Office, dated Dec. 4, 2019, 9 pages.

* cited by examiner

AUTOMATED-TAXI THAT PROPOSES ALTERNATE-DESTINATION TO OPTIMIZE ROUTE

CROSS-REFERENCE TO RELATED APPLICATION

This application claims priority to U.S. Provisional Patent Application No. 62/690,494, titled "AUTOMATED-TAXI THAT PROPOSES ALTERNATE-DESTINATION TO OPTIMIZE ROUTE," filed Jun. 27, 2018, the contents of which are incorporated herein in their entirety.

TECHNICAL FIELD OF INVENTION

This disclosure generally relates to a system for operating an automated-taxi, and more particularly relates to a system that proposes a preferred-route that includes an alternate-destination for the client, where the alternate-destination is within a distance-threshold of a desired-destination of the client.

BRIEF DESCRIPTION OF DRAWINGS

The present invention will now be described, by way of example with reference to the accompanying drawings, in which.

DETAILED DESCRIPTION

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

'One or more' includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for describing embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Figure 1:
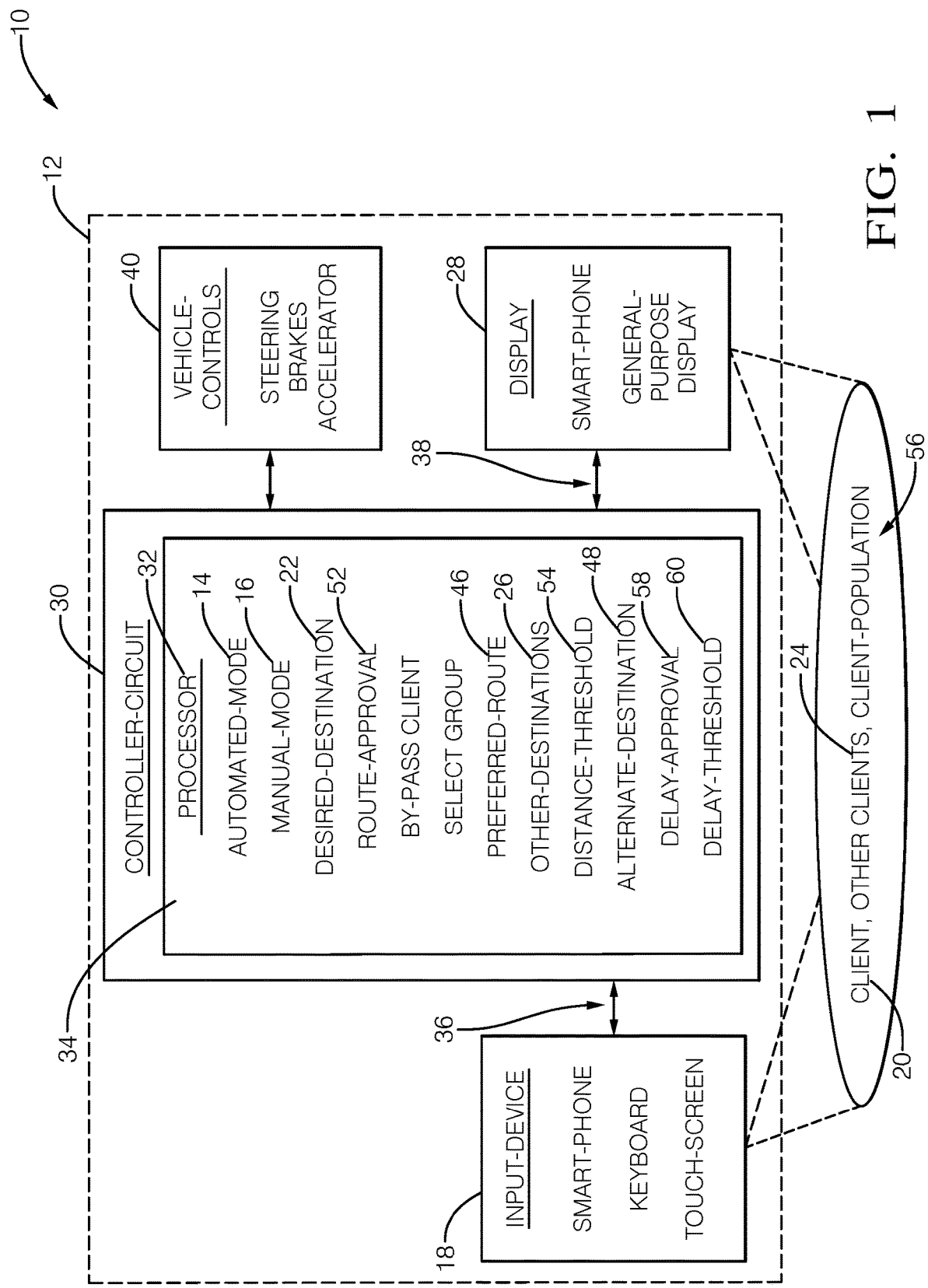
FIG. 1 is a diagram of a system for operating an automated-taxi in accordance with one embodiment.

FIG. 1 illustrates a non-limiting example of a system 10 for operating an automated-taxi 12, which some may refer to as an automated-mobility-on-demand (AMOD) type of vehicle. As will be explained in more detail below, one aspect of the system 10 is to minimize the travel-time and/or travel-distance of an AMOD transporting multiple clients to multiple destinations by optimizing the route taken. The optimization may take into consideration many factors such as, but not limited to, reported traffic-congestion, alternate entrances to locations, areas of pedestrian-congestion, airport congestion-zones or construction-zones. The optimization of the route may include transporting a client to an alternate-destination that is close enough the client's desired-destination.

The automated-taxi 12 may be characterized as an automated vehicle. As used herein, the term automated vehicle may apply to instances when the automated-taxi 12 is being operated in an automated-mode 14, i.e. a fully autonomous mode, where a human-operator (not shown) of the automated-taxi 12 may do little more than designate a destination to operate the automated-taxi 12, if there is any sort of operator in the automated-taxi 12. That is, it is contemplated that the automated-mode 14 includes driverless operation. However, full automation is not a requirement. It is contemplated that the teachings presented herein are useful when the automated-taxi 12 is operated in a manual-mode 16 where the degree or level of automation may be little more than providing navigation guidance to the human-operator who is generally in control of the steering, accelerator, and brakes of the automated-taxi 12.

The system 10 includes an input-device 18 operable by a client 20 to indicate or specify a desired-destination 22 of the client 20 and/or operable by other-clients 24 to indicate or specify other-destinations 26 of the other-clients 24. The input-device 18 may consist of or include one or more of, or any combination of, a smart-phone, a keyboard, a touch-screen, a microphone, or any other suitable means for a person or persons such as the client 20 or the other-clients 24 to provide information to the system 10. The input-device 18 may be carried by the client (e.g. a smart-phone or tablet), or located at kiosk or pickup-site, or located in or on the automated-taxi 12. As suggested in FIG. 1, the client 20 or the other-clients 24 may already be aboard the automated-taxi, or waiting to board the automated-taxi 12, or requesting transportation by the automated-taxi 12 when the desired-destination 22 or the other-destinations 26 are indicated. As will become apparent in the description that follows, the information provided to the system 10 by the client 20 or the other-clients 24 is not limited to the desired-destination 22 or the other-destinations 26.

The system 10 includes a display 28 viewable by the client 20 and/or the other-clients 24. The display 28 may be or may include any one or combination of a smart-phone or tablet carried by the client 20 or the other-clients, or a general-purpose-display located at pick-up/drop-off kiosk, or located in or on the automated-taxi 12. It is noted that the display 28 and the input-device 18 may be integrated in to a single touch-screen type device such as a smart-phone, but are referred to separately herein to facilitate explaining the system 10. That is, those in the art will recognize that the distinct functions of detecting the touching of a touch-screen and displaying information on a touch-screen are separate parts even though to the casual observer they appear to be the same thing.

The system 10 includes a controller-circuit 30 in communication with the input-device 18 via an input 36 and the display 28 via an output 38. The controller-circuit 30, hereafter sometimes referred to as the controller 30, may include one or more instances of a processor 32 such as one or more instances of a microprocessor or other control circuitry such as analog and/or digital control circuitry including an application specific integrated circuit (ASIC) for processing data as should be evident to those in the art. While the system 10 described herein is generally described in terms of having a single instance of the controller 30, it is recognized that the functions of the controller 30 may be shared or distributed among several instances of controllers that are each configured for some specific task. Hereafter, any reference to the controller 30 being configured for something is to also be interpreted as suggesting that the processor 32 may also be configured for the same thing. It is also recognized that there may be multiple instances of processors in any instance of the controller 30. The controller 30 may include memory 34, i.e. non-transitory computer-readable storage-medium, including non-volatile memory, such as electrically erasable programmable read-only memory (EEPROM) for storing one or more routines, thresholds, and captured data. The memory 34 may be part of the processor 32, or part of the controller 30, or separate from the controller 30 such as remote memory stored in the cloud. The one or more routines may be executed by the controller 30 or the processor 32 to perform steps for operating the automated-taxi 12 via vehicle-controls 40 (e.g. steering, brakes, accelerator) based on signals received by the controller 30 from, but not limited to the input-device 18. Those in the automated vehicle arts will recognize that the means and techniques for automated control of the automated-taxi 12 via the vehicle-controls 40 are well-known.

Figure 2:
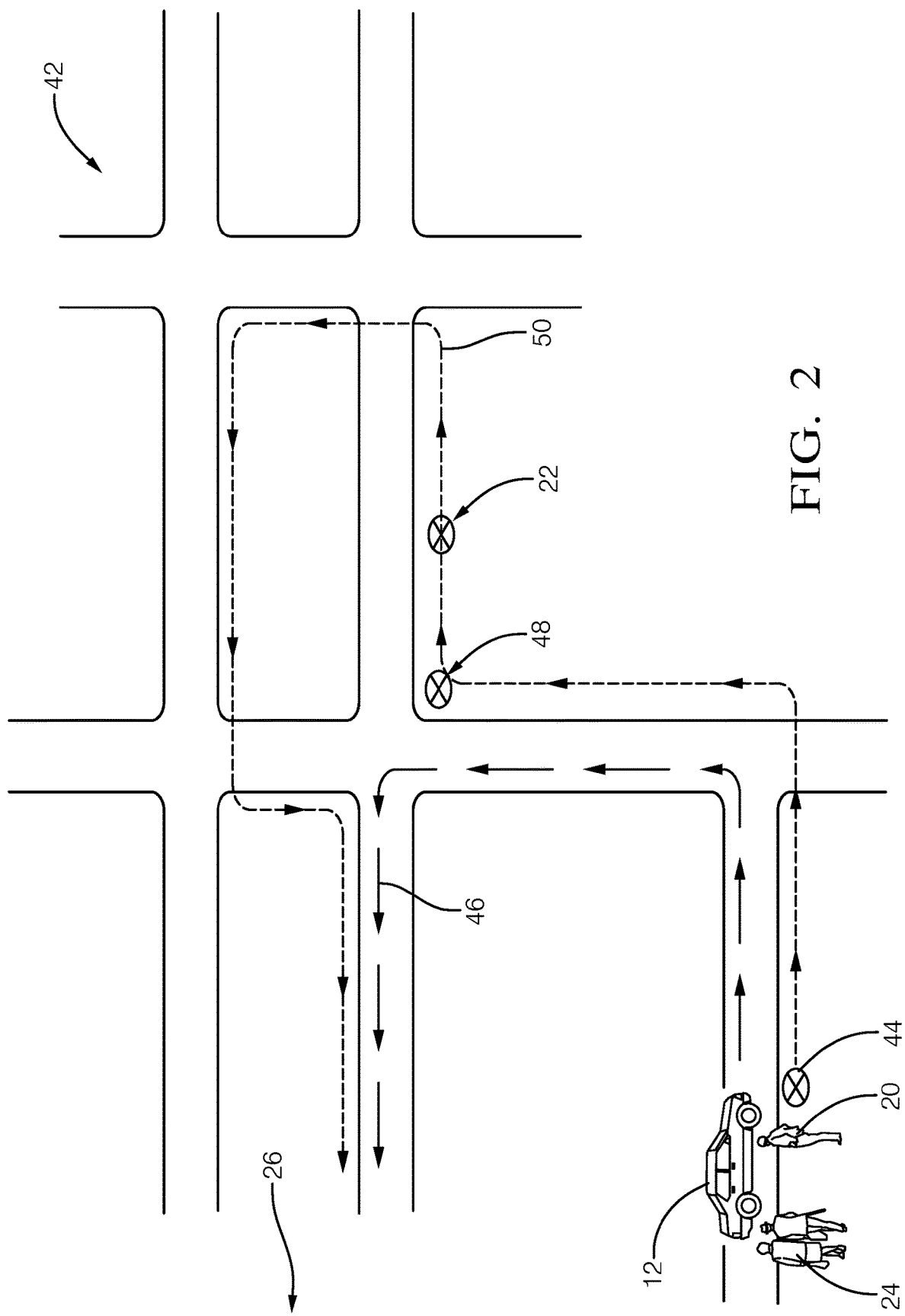
FIG. 2 is a scenario encountered by the system of FIG. 1 in accordance with one embodiment.

FIG. 2 illustrates a non-limiting example of a scenario 42 where a the automated-taxi 12 is preparing to pick-up the client 20 and the other-clients 24 at a pick-up location 44. It is contemplated that there may already be one or more other-clients (not shown) already in the automated-taxi 12. Also, the presence of the other-clients at the pick-up location 44 is not a requirement. That is, it is contemplated that the client 20 may be the only person to board the automated-taxi 12 at the pick-up location 44, and there may or may not be others present in the automated-taxi when the client 20 boards. It is further contemplated that instances of the other-clients 24 may board the automated-taxi 12 at a different location after picking up the client 20 after the desired-destination 22 of the client 20 has been entered or conveyed by the client 20 and/or received by the system 100.

The controller-circuit 30 is configured determine and propose a preferred-route 46 in accordance with (i.e. based on) the desired-destination 22 and a plurality of other-destinations 26 (not specifically shown in FIG. 2) indicated by the plurality (e.g. one or more) of the other-clients 24 of the automated-taxi 12. The preferred-route 46 in this non-limiting example includes an alternate-destination 48 for the client 20, where the alternate-destination is relatively close to, but not as close as possible to the desired-destination 22. That is, the alternate-destination is characterized as within a distance-threshold 54, e.g. eighty-five meters (85 m), of the desired-destination 22 of the client 20. As shown in FIG. 2, to deliver the client 20 to the desired-destination 22, the automated-taxi 12 would need to follow a longer-route 50 that delays the arrival of the other-clients 24 to the various instances of the other-destinations 26 of the other-clients 24. While the non-limiting example of the preferred-route 46 shown in FIG. 2 appear to merely try to reduce the total travel distance of the automated-taxi 12, other factors such as, but not limited to, traffic congestion, alternate entrances to locations, pedestrian congestion, airport congestion zones and the like may be considered when determining the preferred-route 46.

In some circumstances, there may be reasons that it is not acceptable to the client 20 to be dropped off at the alternate-destination 48 instead of the desired-destination 22. For example, the client 20 may be disabled, or have too many packages to carry from the alternate-destination 48 to the desired-destination 22, and/or it may be raining and/or cold and the client 20 is not properly equipped for such weather. As such, the controller 30 is advantageously and courteously configured to operate the display 28 to request a route-approval 52 from the client 20 for the alternate-destination 48. That is, the system 10 is configured to get permission from the client 20 to drop-off the client 20 at the alternate-destination 48 rather than the desired-destination 22. In response to receiving the route-approval 52, the system, or more specifically the controller 30 or the processor 32 operates the automated-taxi 12 in accordance with the preferred-route 46 to transport the client to the alternate-destination 48.

As part of requesting the route-approval 52, is it contemplated that the system 10 may display a walking-route and a walking-time or arrival-time to get to desired-destination 22 by walking from the alternate-destination 48. While not likely for the example shown in FIG. 2, scenarios are imagined where/when the client 20 may arrive sooner at the desired-destination 22 by walking from the alternate-destination 48 instead of waiting for the automated-taxi 12 to drive to the desired-destination 22 22. It is also contemplated that the request for the route-approval 52 could show a calorie count for exercise minded people, or show energy savings ecological minded people, and/or offer cost reduction of the fare charged if the alternate-destination is accepted.

In one embodiment of the system 10 or the controller 30 or the processor 32, there may be an option to transport client to desired-destination if route-approval 52 is not given, i.e. the alternate-destination 48 is not accepted. That is, in response to the client 20 denying the route-approval 52, the controller-circuit 30 or the processor 32 operates the vehicle-controls 40, e.g. the steering, brakes, and accelerator of the automated-taxi 12 to transport the client 20 to the desired-destination 22.

Alternatively, if the client 20 is not already on-board the automated-taxi 12, the system 10 may cause one instance of the automated-taxi 12 to not pick-up (i.e. bypass) the client 20 if alternate-destination 48 not approved, and may arrange for another instance of an automated-taxi to pick-up the client 20. That is, in response to the client 20 denying the route-approval 52, the controller-circuit 30 (or the processor 32) may operate the automated-taxi 12 to by-pass the client 20. It is also contemplated that even if the client 20 is already on-board the automated-taxi 12, in response to the client 20 denying the route-approval 52, the system 10 may ask the client 20 exit the automated-taxi 12 and board another automated-taxi nearby or approaching the location where the client is asked to exit.

If there are more other-clients at the pick-up location 44 than the automated-taxi 12 can transport at one time, the system 10 may select the other-clients to travel with the client 20 from the client-population 56 either at the pick-up location 44 and/or other pick-up locations (not show) along the preferred-route 46, where those selected are characterized as those headed in the same general direction. That is, the controller-circuit 30 may be configured to select the client 20 and the other-clients 24 from a client-population 56 based on the desired-destination 22 of the client 20 and the other-destinations 26 of the other-clients.

If the client 20 is not on-board, and picking up the client 20 may cause a delay of the arrival times of other-clients 24 already on board the automated-taxi 12, the system 10 may ask or request that the other-clients approve picking-up the client 20 before doing so. That is, the controller-circuit 30 may be configured to request a delay-approval 58 from the other-clients 24 when picking-up and taking the client 20 to the desired-destination increases one or more arrival-times of the other-clients 24 by greater than a delay-threshold 60, e.g. two minutes (2 min.). In response to one or more of the other-clients denying the delay-approval 58, the controller-circuit 30 may operate the automated-taxi 12 to by-pass the client 20.

Figure 3:
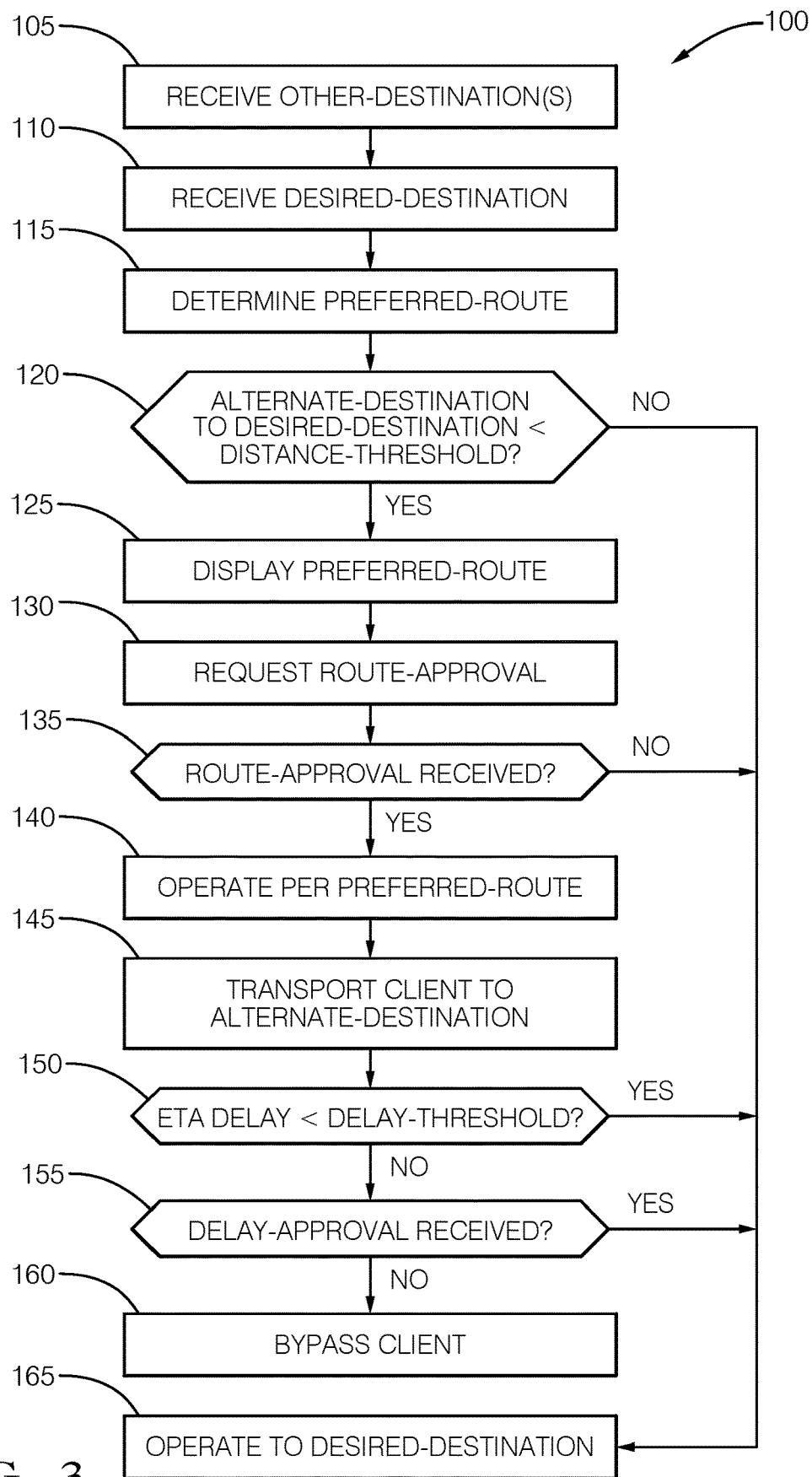
FIG. 3 is a method of operating the system of FIG. 1 in accordance with one embodiment.

FIG. 3 illustrates a non-limiting example of a method 100 of operating the automated-taxi 12.

Step 105, RECEIVE OTHER-DESTINATION(S), may include communicating with the client-population 56, which includes the other-clients 24, via any number of communications means including, but not limit to smart-phones carried by the client-population 56, or a touch-screen or keyboard/mouse form to the input-device 18 to receive the other-destinations 26.

Step 110, RECEIVE DESIRED-DESTINATION, may include receiving the desired-destination 22 of the client 20 from the input-device 18 which is operable by the client. The order of steps 105 and 110 may be reversed. In one situation, the other-clients 24 may have been previously selected from the client-population 56 because the other-clients 24 have destinations that are nearby each other or are in the same general direction from where the other-clients 24 boarded the automated-taxi 12. In this situation, the client 20 may be picked up at the pickup-location 44 (FIG. 2) because the route of the automated-taxi 12 passes near the pick-up-location 44. That is, the method 100 includes selecting the client 20 and the other-clients 24 from a client-population 56 based on the desired-destination 22 and the other-destinations 26. In another situation, the client 20 may be the first person selected for transport ion by the automated-taxi 12 because, for example, the client 20 is a preferred customer (e.g. frequent rider), or the client 20 is already on board the automated-taxi when the other-clients 24 are picked-up.

Step 115, DETERMINE PREFERRED-ROUTE, may include determining a preferred-route 46 in accordance with the desired-destination 22 and a plurality of other-destinations 26 indicated by a plurality of other-clients 24 of an automated-taxi 12. The preferred-route 46 may include, suggest, or propose an alternate-destination 48 for the client 20, where the alternate-destination 48 is characterized as located within (i.e. closer than) a distance-threshold 54 from the desired-destination 22 of the client 20.

Step 120, ALTERNATE-DESTINATION TO DESIRED-DESTINATION<DISTANCE-THRESHOLD?, may include consulting a digital-map or other navigation database to determine the distance between the alternate-destination 48 and the desired-destination 22, and comparing that difference to the distance-threshold 54 to determine if the alternate-destination 48 is acceptable to at least predetermined rules for selecting an instance of the alternate-destination 48.

Step 125, DISPLAY PREFERRED-ROUTE, may include operating the display 28 to show a map or representation of the preferred-route 46 to the client 20. The desired-destination 22 and the alternate-destination 48 may also be displayed along with other information such as, but not limited to, an estimate of the distance between the desired-destination 22 and the alternate-destination 48, an estimate of how long it will take the client to walk from the alternate-destination 48 to the desired-destination 22, and/or how much less the client 20 will be charged by agreeing to be dropped-off at the alternate-destination 48 instead of the desired-destination 22.

Step 130, REQUEST ROUTE-APPROVAL, may include requesting a route-approval 52 from the client 20 for transporting the client 20 to the alternate-destination 48 instead of the desired-destination 22. The requesting of the route-approval 52 may be, for example, done via a smart-phone carried by the client 20, or may require a password or identification verification if the route-approval 52 is conveyed from the client 20 using a public input terminal at the pick-up location 44.

Step 135, ROUTE-APPROVAL RECEIVED?, may include updating the planned route displayed to the other-clients 24, and optionally proposing alternative drop-off locations for one or more of the other-clients 24 so the overall efficiency of transporting all passengers on the automated-taxi 12.

Step 140, OPERATE PER PREFERRED-ROUTE, may include the controller-circuit 30 outputting signals effective for operating the vehicle-controls 40 of the automated-taxi 12 so the preferred-route 46 is followed.

Step 145, TRANSPORT CLIENT TO ALTERNATE-DESTINATION, may include, in response to receiving the route-approval 52, operating the automated-taxi 12 in accordance with the preferred-route 46 to transport the client 20 to the alternate-destination 48.

Step 150, ETA DELAY<DELAY-THRESHOLD?, is an optional step that may be executed when the client 20 denies the route-approval 52, thereby requiring the automated-taxi 12 to travel to the desired-destination 22, and delaying the estimated time of arrival (ETA) of the other-clients 24 to their respective destination.

Step 155, DELAY-APPROVAL RECEIVED?, may include logging the various responses from the other-clients 24 to a request for a delay-approval 58. If all or a substantial majority (e.g. >75%) grant the delay-approval 58, then the client 20 is transported to the desired-destination. In one scenario, the client 20 is already in the automated-taxi when the delay-approval 58 is requested. If the delay-approval 58 is denied, the client 20 may be dropped off a transfer-station where another automated-taxi may pick-up the client 20 and complete the transportation to the desired-destination. If the client 20 is not on-board but is waiting at the pick-up location 44, the automated-taxi 12 may bypass (i.e. not pick-up) the client 20, and the system 10 may arrange for another automated-taxi to pick-up the client 20.

Step 160, BYPASS CLIENT, may include in response to the client denying the route-approval, operating the automated-taxi to by-pass the client 20, e.g. drive past the pick-up location 44 without stopping.

Step 165, OPERATE TO DESIRED-DESTINATION, may include in response to the client denying the route-approval or for other reasons suggested above, operating the automated-taxi 12 to transport the client 20 to the desired-destination 22

Described herein is a first device 30 that includes one or more processors 32; memory 34; and one or more programs 105-165 stored in memory 34. The one or more programs 105-165 include instructions for performing all or part of the method 100. Also, described herein is a non-transitory computer-readable storage-medium 34 comprising one or more programs 105-165 for execution by one or more processors 32 of a first device 30. The one or more programs 105-165 include instructions which, when executed by the one or more processors 32, cause the first device 30 to perform all or part of the method 100.

Accordingly, a system 10, a controller 30 for the system 10, and a method 100 of operating the system 10 are provided. The automated-taxi 12 has adaptable routing that takes into consideration multiple destinations of multiple clients, determines an optimum route for the automated-taxi that may include delivering one or more clients to locations that are 'close enough' to their desired destinations.

While this invention has been described in terms of the preferred embodiments thereof, it is not intended to be so limited, but rather only to the extent set forth in the claims that follow.

We claim:

1. A system for operating an automated-taxi, wherein the system comprises:
    an input-device operable by a client to indicate a desired-destination of the client;
    a display viewable by the client; and
    a controller-circuit in communication with the input-device and the display, wherein the controller-circuit is configured to:
        determine, based on the desired-destination and a plurality of other-destinations indicated by a plurality of other-clients of the automated taxi, a preferred-route that includes an alternate-destination for the client that is within a distance threshold of the desired-destination of the client;
        operate, subsequent to identification of the alternate-destination, the display to request a route-approval from the client for the alternate-destination;
        in response to receiving the route-approval related to the alternate-destination, operate the automated-taxi in accordance with the preferred-route to transport the client to the alternate-destination; and
        request a delay-approval from the other-clients when taking the client to the desired-destination increases one or more arrival-times of the other-clients by greater than a delay-threshold, and, in response to one or more of the other-clients denying the delay-approval, the controller-circuit operates the automated-taxi to by-pass the client.

2. The system in accordance with claim 1, wherein, in response to the client denying the route-approval, the controller-circuit operates the automated-taxi to transport the client to the desired-destination.

3. The system in accordance with claim 1, wherein, in response to the client denying the route-approval, the controller-circuit operates the automated-taxi to by-pass the client.

4. The system in accordance with claim 1, wherein, the controller-circuit is configured to select the client and the other-clients from a client-population based on the desired-destination and the other-destinations.

5. A controller-circuit for operating an automated-taxi, said controller-circuit comprising:
    an input configured to communicate with an input-device operable by a client to indicate a desired-destination of the client;
    an output configured to communicate with a display viewable by the client; and
    a processor in communication with the input-device and the display, said processor configured to:
        determine a preferred-route in accordance with the desired-destination and a plurality of other-destinations indicated by a plurality of other-clients of an automated-taxi, wherein the preferred-route includes an alternate-destination for the client, said alternate-destination characterized as within a distance-threshold of the desired-destination of the client;
        operate, subsequent to identification of the alternate-destination, the display to request a route-approval from the client for the alternate-destination;
        in response to receiving the route-approval related to the alternate-destination, operate the automated-taxi in accordance with the preferred-route to transport the client to the alternate-destination; and
        request a delay-approval from the other-clients when taking the client to the desired-destination increases one or more arrival-times of the other-clients by greater than a delay-threshold, and, in response to one or more of the other-clients denying the delay-approval, the processor operates the automated-taxi to by-pass the client.

6. The controller-circuit in accordance with claim 5, wherein, in response to the client denying the route-approval, the processor operates the automated-taxi to transport the client to the desired-destination.

7. The controller-circuit in accordance with claim 5, wherein, in response to the client denying the route-approval, the processor operates the automated-taxi to by-pass the client.

8. The controller-circuit in accordance with claim 5, wherein, the processor is configured to select the client and the other-clients from a client-population based on the desired-destination and the other-destinations.

9. A method for operating an automated-taxi, said method comprising:
    receiving a desired-destination of a client from an input-device operable by the client;
    determining a preferred-route in accordance with the desired-destination and a plurality of other-destinations indicated by a plurality of other-clients of an automated-taxi, wherein the preferred-route includes an alternate-destination for the client, said alternate-destination characterized as within a distance-threshold of the desired-destination of the client;
    operating, based on the alternate-destination, a display to show the preferred-route to the client;
    requesting a route-approval from the client for the alternate-destination;

requesting a delay-approval from the other-clients when taking the client to the desired-destination increases one or more arrival-times of the other-clients by greater than a delay-threshold;

in response to one or more of the other-clients denying the delay-approval, operating the automated-taxi to by-pass the client; and in response to receiving the route-approval related to the alternate-destination and in response to the other-clients not denying the delay-approval, operating the automated-taxi in accordance with the preferred-route to transport the client to the alternate-destination.

10. The method in accordance with claim 9, wherein the method includes, in response to the client denying the route-approval, operating the automated-taxi to transport the client to the desired-destination.

11. The method in accordance with claim 9, wherein the method includes, in response to the client denying the route-approval, operating the automated-taxi to by-pass the client.

12. The method in accordance with claim 9, wherein the method includes selecting the client and the other-clients from a client-population based on the desired-destination and the other-destinations.

* * * * *

UNITED STATES PATENT AND TRADEMARK OFFICE
CERTIFICATE OF CORRECTION

PATENT NO. : 11,157,005 B2
APPLICATION NO. : 16/021522
DATED : October 26, 2021
INVENTOR(S) : Mangal et al.

Page 1 of 1

It is certified that error appears in the above-identified patent and that said Letters Patent is hereby corrected as shown below:

On the Title Page

Column 2 item (57), (Abstract), Line 6, after "configured" insert -- to --.

In the Claims

Column 7, Line 46, in Claim 1, delete "automated taxi," and insert -- automated-taxi, --, therefor.

Column 7, Line 48, in Claim 1, delete "distance threshold" and insert -- distance-threshold --, therefor.

Signed and Sealed this
Fourteenth Day of June, 2022

Katherine Kelly Vidal
*Director of the United States Patent and Trademark Office*